United States Patent [19]

Eckberg, Jr. et al.

[11] Patent Number: 4,769,810
[45] Date of Patent: Sep. 6, 1988

[54] PACKET SWITCHING SYSTEM ARRANGED FOR CONGESTION CONTROL THROUGH BANDWIDTH MANAGEMENT

[75] Inventors: Adrian E. Eckberg, Jr., Holmdel; Daniel T. Luan, East Brunswick; David M. Lucantoni, Eatontown; Tibor J. Schonfeld, Livingston, all of N.J.

[73] Assignee: American Telephone and Telegraph Company, AT&T Bell Laboratories, Murray Hill, N.J.

[21] Appl. No.: 948,151

[22] Filed: Dec. 31, 1986

[51] Int. Cl.[4] ............................................. H04J 3/26
[52] U.S. Cl. ......................................... 370/60; 370/94
[58] Field of Search .............................. 370/79, 60, 94; 340/825.5

[56] References Cited

U.S. PATENT DOCUMENTS

| | | | |
|---|---|---|---|
| 4,484,326 | 11/1984 | Turner | 370/60 |
| 4,566,095 | 1/1986 | Devault et al. | 370/94 |
| 4,616,359 | 10/1986 | Fontenot | 370/60 |
| 4,630,259 | 12/1986 | Larson et al. | 370/60 |
| 4,703,477 | 10/1987 | Adelmann et al. | 370/94 |

FOREIGN PATENT DOCUMENTS 0177761  9/1985  Japan ..................................... 370/60

OTHER PUBLICATIONS

*IEEE Transactions on Communications*, vol. Com-28, No. 4, Apr. 1980, M. Gerla et al., "Flow Control: A Comparative Survey", pp. 553-574.

*IEEE Communication Magazine*, vol. 24, No. 10, Oct. 1986, J. S. Turner, "New Directions in Communications (or Which Way to the Information Age)", pp. 8-15.

*Primary Examiner*—Douglas W. Olms
*Assistant Examiner*—Melvin Marcelo
*Attorney, Agent, or Firm*—Richard B. Havill

[57] ABSTRACT

In a packet switching network, packet monitoring and marking algorithms are used for determining which data packets, received from a customer by an access node, are being transmitted at an excessive transmission rate and accordingly are marked. Additionally every packet from a special customer can be marked. Along in the network, marked packets are dropped where the network is congested along the path being traversed by the data packets.

23 Claims, 8 Drawing Sheets

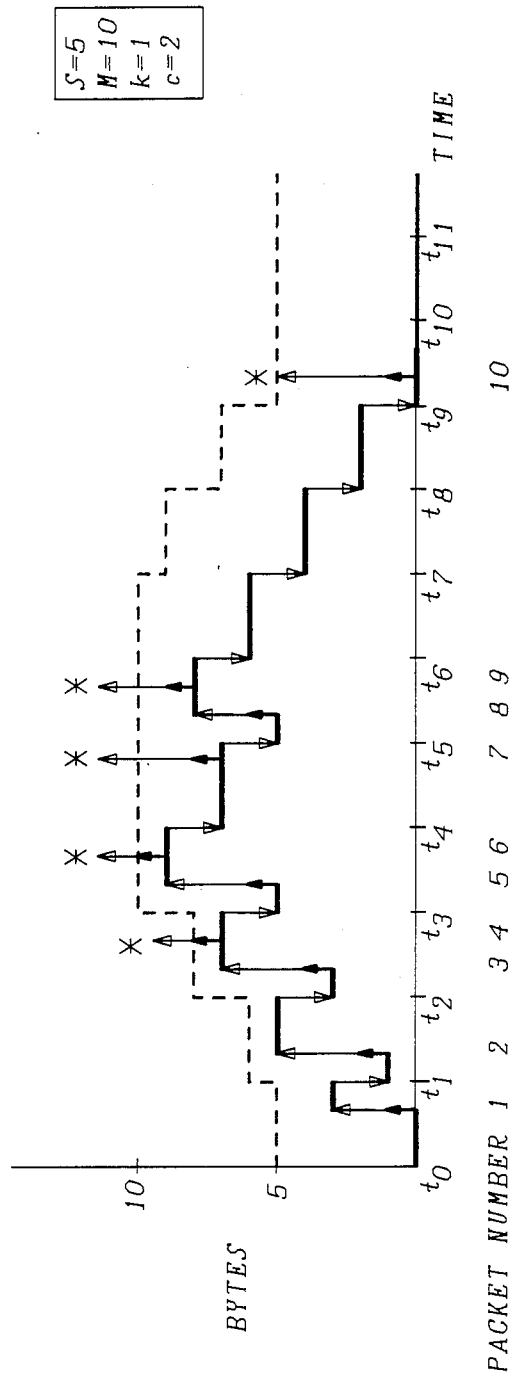

PACKET SWITCHING SYSTEM ARRANGED FOR CONGESTION CONTROL THROUGH BANDWIDTH MANAGEMENT

TECHNICAL FIELD

This invention relates to a packet switching system arranged for controlling switch node and link congestion caused by customers transmitting information at excessive rates.

BACKGROUND OF THE INVENTION

Packet communication involves a technique of disassembling information at the sending end of a switching network for insertion into separate bursts, or packets, of data and reassembling the same information from the data packets at the receiving end of the network. Communication according to this technique is especially useful in common carrier or time-shared switching systems, since the communication path or circuit required for the packet transmissions is needed only while each packet is being forwarded through the network, and is, therefore, available to other users during intervening periods.

Packet switching offers another attractive feature. That is the flexibility of providing integrated information transport services for a wide range of applications, e.g., interactive data, bulk data, signaling, packetized voice, image, etc. Instead of designing specialized networks optimized for specific forms of applications, many services can be simultaneously operated over the same connection to the network. All varieties of user information are converted into packets, and the network transports these packets between users. End users are not tied to fixed rate connections. Instead, network connections adapt to the particular needs of the end user. Furthermore, it is possible to create a uniform user-network interface applicable to a broad range of services. Note that different applications may require different grades of service from the network. For example, packetized voice transmission has very stringent delay requirements for delivery of associated packets of an ongoing conversation.

Efficient utilization of network resources can be attained by allowing packetized transmissions of a plurality of users on the same connection on a time-shared basis. Thus the packets of one user are interspersed with the packets of other users.

Elements of the resources or facilities which may be shared in such packet networks include transmission link bandwidth (defined as bytes/sec, a measure of link capacity), processor real time (i.e., time immediately available for processing packets), ports or links, and data or packet buffers. In large multinode networks, each node or packet switch accommodates many such ports or links that terminate paths which extend to users' terminal equipments or to other nodes. Each node may include one or more processors for controlling the routing and processing of packets through the node. The node is customarily equipped with a large number of buffers for storing packets prior to such routing or while awaiting an output link. Each line between nodes or extending to users typically serves a plurality of concurrent calls between different terminal equipments. Each packet passing through the network consumes a certain amount of processor real time at each node, takes away a certain amount of link capacity (proportional to the packet size), and occupies buffers while being processed. There is a maximal number of packets per unit of time that a network can accommodate. This notion of "capacity" depends on all the aforementioned resources provisioned within the network, as well as on the particular traffic mix generated by the users.

One problem in a packet switching system arises when many users attempt to utilize the network at the same time. This results in the formation of many paths or circuits for routing the packets and the congestion of the communication facilities. Congestion of a facility is the occurrence of more work than can be handled by the facility in a specific period of time. It has been found that congestion tends to spread through the network if the congestion is uncontrolled. As a result, it is desirable to have a flow/congestion control mechanism for protecting the expected performance level for each service type (e.g., voice) from unpredictable traffic overloads due to other service types. Protection from overload can be provided through the allocation of key network resources. In the event that a key resource is overloaded by traffic, it is desirable that the overall performance of the system should degrade as gracefully as possible. Controlling the utilization of the key resource may require different objectives under the overload condition than under a normal load condition.

A principal area of packet congestion is in buffers, or queues, in each node, particularly where the buffers become unavailable to store incoming packets. Yet the buffer requirement is closely related to the utilization of processor real time and/or link bandwidth. When the processor real time is exhausting, or when the link bandwidth is not sufficient to handle the packet traffic, queues within the switching node will build up causing a long delay. Finally packet buffers will be exhausted, resulting in the dropping of packets. A number of flow control procedures, e.g., end-to-end windowing, have been developed and commercially exploited for controlling congestion.

The known end-to-end windowing scheme for flow control is advantageous when network operation is viewed strictly from the network periphery. Each machine can have many logical channels simultaneously established between itself and various other machines. For each of these logical channels, a given machine is allowed to have W unacknowledged packets outstanding in the network. For example, a machine can initially transmit W packets into the network as fast as it desires; but, thereafter, it must wait until it has received an acknowledgment from the destination machine for at least one of those outstanding packets before it can transmit more packets.

This very scheme has several very desirable properties. There is very little wasted link bandwidth caused by the flow-controlling mechanism, because the number of bits in an acknowledgment can be made very small compared to the numbe of bits in the W packets to which it refers. There is an automatic throttling of transmission under a heavy load condition, because the increased round-trip delay will slow down the acknowledgments and hence the traffic source.

There also are disadvantages to the end-to-end window flow control. The windowing mechanism by itself is not robust enough. The mechanism relies upon the end user adhering to an agreed-upon window size. By unilaterally increasing its window size, an abusive user can get favorable performance while degrading the performance for other users. Even if all users obey their specified end-to-end window sizes, it is very difficult to determine suitable window sizes for various load conditions. In general, the window size W is chosen large enough to allow uninterrupted transmission when the network is lightly loaded; however, overload conditions may require an unacceptably large amount of buffer storage within the packet switch. It is possible for end users to adaptively adjust their window sizes based on network congestion, but this by itself would not necessarily give a fair congestion control.

Another drawback to relying upon the end-to-end windowing mechanism is that not all agreed-upon user applications are subject to window-based end-to-end control. For example, the Unnumbered Information (UI) transfer embedded in some window-based protocols, e.g., LAPD, allows the end users to send packets without any windowing limitation. Other examples are packetized voice or packetized voice-band data applications where an end-to-end window is not applicable.

It has been proposed that in an integrated voice of data packet network the proper way to control flow or congestion is by allocating bandwidth to connections and by making new connections only when the needed bandwidth is available.

This means that the network must provide a mechanism for users to select their bandwidth needs and indicate the burstiness of their transmissions. Thereafter, the network must enforce those parameters with respect to the respective users.

A key part of bandwidth allocation is the mechanism used to select and specify the needed bandwidth and to limit users to their selections. Perhaps the simplest approach is the so-called "leaky bucket" method. A count in a counter, associated with each user terminal transmitting on a connection, is incremented whenever the user sends a packet and is decremented periodically. The user selects the rate at which the count is decremented (this determines the average bandwidth) and the value of a threshold (a number indicating burstiness). If the count exceeds the threshold upon being incremented, the network discards that packet.

There are problems with this "leaky bucket" bandwidth allocation proposal. A major problem is the fact that the control is open-loop in nature. A user's packets will be dropped once the threshold is exceeded even when the network could have handled the packets. Precious network resources would be wasted. The unnecessary throttling of that user's data may sustain the information transfer over a lengthy period, contributing to network congestion at a later time. Another problem is that the limiting network resource may be processor real time rather than link bandwidth.

SUMMARY OF THE INVENTION

These and other problems are resolved by a novel method and apparatus for controlling congestion in a packet switching network. The network utilizes packet monitoring and marking algorithms to determine which data packets received by an access node are being transmitted at an excessive rate and accordingly are marked. Further along in the network, marked packets are dropped if the network is congested at any point along the path being traversed by the data packets.

Features of a packet dropping algorithm, described hereinafter, are defined in a copending patent application filed concurrently herewith in the names of A. E. Eckberg, JR.-D. T. Luan-D. M Lucantoni-T. J. Schonfeld U.S. Ser. No. 948,152.

BRIEF DESCRIPTION OF THE DRAWINGS

The invention may be better understood by reading the following detailed description with reference to the drawings wherein

FIG. 9 is a graphic illustration of the performance actions of the algorithms shown in FIGS. 4 and 8 for a sequence of packets from a customer.

DETAILED DESCRIPTION

Figure 1:
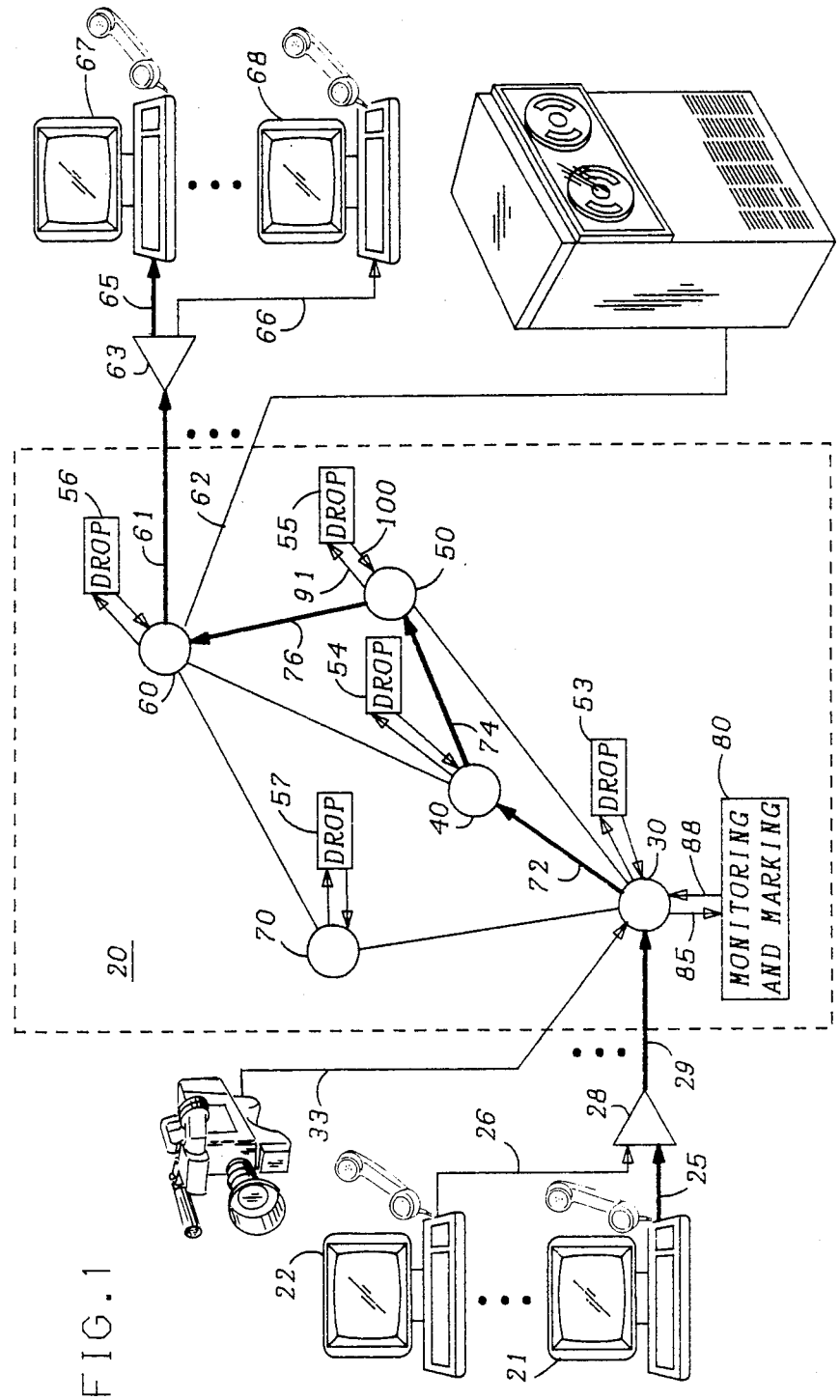
FIG. 1 illustrates a packet switching network arranged for interconnecting voice/data/video terminals and controlling congestion within the network.

Referring now to FIG. 1, there is shown a packet switching network 20 that is arranged for establishing virtual circuit connections between pairs of terminal equipments. Terminals 21 and 22 transmit packets of data through customer connection lines 25 and 26 to a packet multiplexer 28. Other terminals, not shown in FIG. 1 but indicated by a series of dots, also can transmit packets of data into the multiplexer 28. Although the terminals 21 and 22 are shown as computer terminals, they also may be digitized voice, video, or other data terminals. A resulting output stream of packets, interspersed with one another, are transmitting from the multiplexer 28 over an access line 29 to an access node 30 in the packet switching network 20. Another access line 33, and other access lines represented by a series of dots, also transmit streams of data packets into the access node 30. Some of these access lines originate at a multiplexer and others originate at a high speed terminal equipment.

Although a typical packet switching network may be a very complex network of switch nodes and links, only five switch nodes 30, 40, 50, 60 and 70 are shown in FIG. 1 to illustrate an arrangement of the invention.

In FIG. 1 only node 30 is arranged as an access node for receiving packets from customers' terminal equipments. Any or all of the other nodes 40, 50, 60 or 70 may also be access nodes in an operating system, but are not shown as access nodes in the network 20 merely to simplify the drawing.

Node 60 is shown as an egress node in FIG. 1. The other nodes also may be egree nodes but are not shown as such in FIG. 1 to simplify the drawing. From the egress node 60, streams of packets are transmitted over egress lines 61 and 62 and others, represented by a series of dots, to demultiplexers or customers' equipments. For purposes of simplification of FIG. 1, only a single demultiplexer 63 is shown. The stream of data packets transmitted over the egress line 61 is separated within the demultiplexer 63 according to customer identify so that customer packets are passed over customer connection lines 65 and 66, respectively, to customer terminals 67 and 68. Other customer lines and terminals also are supplied with streams of packets from the demultiplexer 63. Those other customer lines and terminals are represented in FIG. 1 by a series of dots.

For purposes of illustrating the operation of the data switching network 20, an exemplary virtual connection is shown by a heavily weighed path line linking the terminal equipment 21 to the terminal equipment 67. Although typical transmission is two-way over such a virtual connection, only one-way transmission from the terminal equipment 21 through the network 20 to the terminal equipment 67 is shown in FIG. 1. This virtual circuit connection is established from the multiplexer 28 and access line 29 through the access node 30, switch nodes 40 and 50, links 72, 74 and 76, egress node 60, and egress link 61 to the demultiplexer 63.

The network 20 is arranged for congestion control. Links and switches are provisioned in quantities that permit unimpeded transmission of all packets up to a limit. Congestion, which potentially might occur at any point within the network 20, can impede the progress of a growing number of packets if the congestion continues for an extended period of time. As a result, the congestion can spread throughout the network and disable the network from effective operation.

The advantageous congestion control scheme, herein presented, is directed toward monitoring and marking selected customer data packets and eliminating or dropping from further transmission through the network marked data packets whenever and wherever they encounter a congestion condition. This control scheme is implemented by algorithms which affect individual data packets at various times and points within the network as a continuing stream of packets progresses through the virtual connection. Each customer or end user may establish multiple virtual connections to different customers of the network. The monitoring and marking scheme can be implemented on a per virtual circuit basis, on a per group of virtual circuits basis, or on a per customer basis. To simplify further explanation, we assume there is only one virtual circuit per customer, so the terms customer and virtual circuit will be synonymous hereinafter.

A first algorithm is for monitoring the bandwidth of a customer and for marking that customer's packets when that customer's subscribed bandwidth is exceeded. In this context, bandwidth may be defined as a two-dimensional quantity in the units (bytes/sec, packets/sec) to distinguish between whether link bandwidth or processor real time is the limiting resource. The subscribed bandwidth is described in terms of an average rate (a throughput in bytes/sec that is guaranteed to be achievable by the user with packets of a specified size) and a burstiness factor (where a measure of burstiness is, for example, the peak to mean ratio of the transmission rate as well as the duration of the peak transmissions). The first algorithm is used at the receive side of the access node 30. Each of the packets received from the access line 29 includes information in a header for identifying the virtual circuit connection to which the packet belongs. Accordingly the various packets are stored in registers and are identified with specific virtual circuits.

Information from the headers of packets, being transmitted by the terminal equipment 21, and being received by the access node 30, is applied to a bandwidth monitoring and packet marking circuit 80 in FIG. 1.

Figure 2:
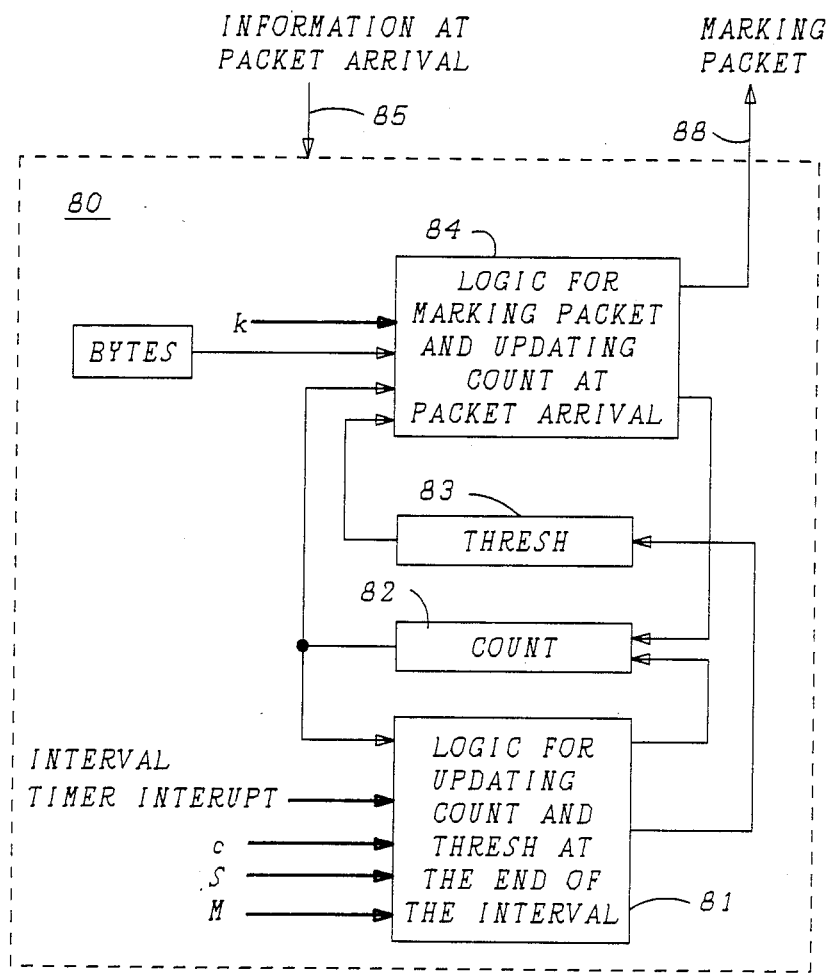
FIG. 2 is a block diagram of circuitry arranged for monitoring the rate of transmission of a customer and for marketing that customer's packets.

Referring now to FIG. 2, there is a block diagram of the circuit 80 which performs the proposed bandwidth monitoring and packet marking functions on a per customer basis. Only information packets, identified as originating from the terminal 21 of FIG. 1 and transmitted through the heavily weighted line linking to the terminal 67 is monitored by the algorithm. The circuit 80 is time shared for performing the same functions with respect to other virtual connections, but all of the monitoring and marking is done separately with respect to individual virtual connections.

The monitoring is accomplished by an algorithm which determines whether or not the individual customer at terminal 21 is transmitting at an excessive rate (a rate greater than the subscribed rate) over the virtual circuit extending to the terminal 67.

When the illustrated virtual connection is set up, the customer terminal equipment 21 and the network 20 negotiate for a desired bandwidth allocation relating to the virtual connection. The bandwidth allocation will be called the selected, or subscribed, transmission rate. Information transmissions which exceed, or are greater than, the subscribed transmission rate are referred to as excessive rates.

A processor in the access node 30 translates the subscribed transmission rate into the long-term threshold M, a short-term threshold S and a decrement constant c. The long-term threshold M is chosen to accommodate the largest burst size allowed by the subscribed transmission rate, and the short-term threshold S is determined by the maximum instantaneous rate allowed. The decrement constant c relates to the guaranteed average throughput of unmarked packets. These are initializing parameters that are applied to a logic circuit 81 when the virtual connection is established, as shown in FIG. 2, for updating values of COUNT and THRESH at the end of an interval. They are used subsequently in the bandwidth monitoring and packet marking circuit 80. Also initially the value of COUNT in an accumulator 82 is set to zero and an active threshold value THRESH is set equal to S in a register 83. Further, in initialization, a parameter k, which is a weighting factor related to the number of packets per interval, is applied to a logic circuit 84 which produces a signal for marking a packet being transmitted at an excessive transmission rate.

Figure 5:
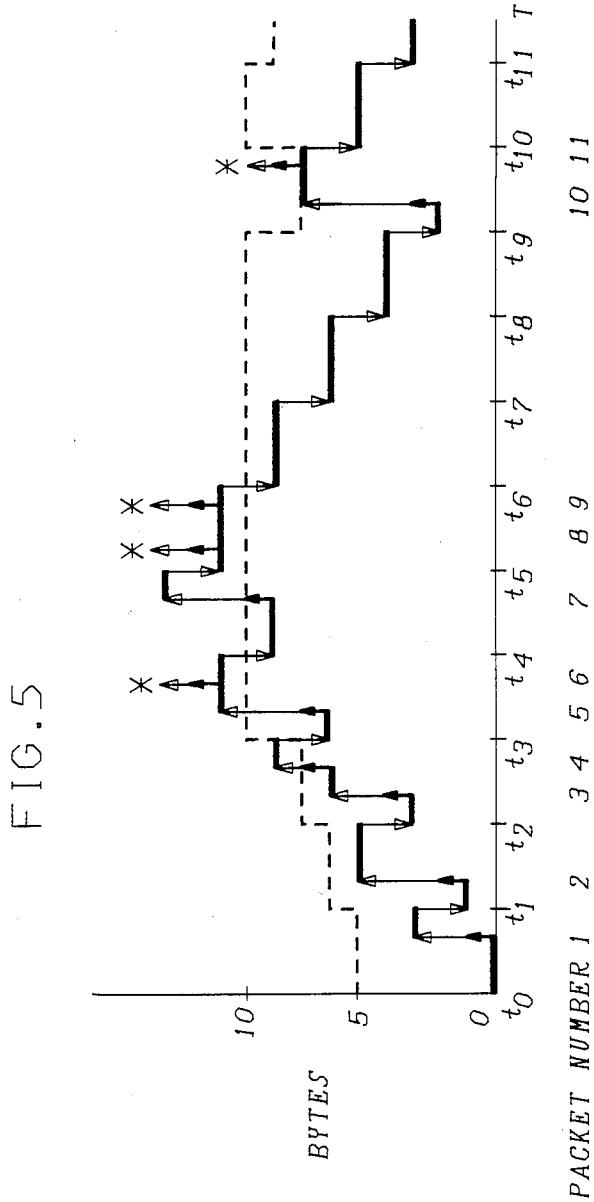
FIG. 5 is a graphic illustration of the actions of the algorithms shown in FIGS. 3 and 4 for a sequence of packets from a customer.

During each interval, as shown in FIGS. 2 and 5, the number of bytes contained in each arriving packet is input by way of lead 85 to the register storing BYTES to be applied to the logic circuit 84. Circuit 84 decides whether or not the specific packet should be marked as being transmitted at an ecessive transmission rate. If the packet is to be marked, a marking signal is generated on the lead 88 for inserting a marking signal into the packet header for identifying the packet as one being transmitted at an excessive transmission rate. If the packet is within the limits of the subscribed transmission rate, no marking signal is generated or inserted into the header of the packet.

There are three alternative packet marking algorithms to be described herein by way of illustrations. Others can be used as well.

PARAMETERS USED IN THE ALGORITHMS (A) AND (B)

I—interval between successive decrements to the value of COUNT in the accumulator; this is a fixed interval for each virtual circuit being monitored and may differ among the virtual circuits; a typical value for I could be in the 10-500 msec range.

k—a parameter by which the value of COUNT in the accumulator is to be incremented for each packet sent from the customer's terminal in addition to the value of BYTES for the packet; the parameter k represents a byte penalty per packet in guaranteed throughput that provides network protection from excessive minimal-sized packets that might otherwise stress real time resources; a typical value for k is a number between 0 and 1000; a value of k equal to zero would be used when processor real time is not a concern.

c—a decrement constant relating to the customer's selected throughput of bytes per interval whic will avoid packets being marked for possibly being dropped; an amount by which the value of COUNT in the accumulator is to be decremented during each interval; the number of a customer's bytes per interval (subscribed transmission rate) that will guarantee all transmitted packets are unmarked.

S—a short-term or instantaneous threshold on throughput during each interval which, if exceeded, will cause packets to be marked.

M—a long-term bandwidth threshold related to allowable "burst" size.

BYTES—the number of bytes in a packet being received, from a customer's terminal, by an access node.

COUNT—the value in the accumulator.

THRESH—a variable threshold.

BANDWIDTH MONITORING AND PACKET MARKETING -ALGORITHM (A)

Figure 3:
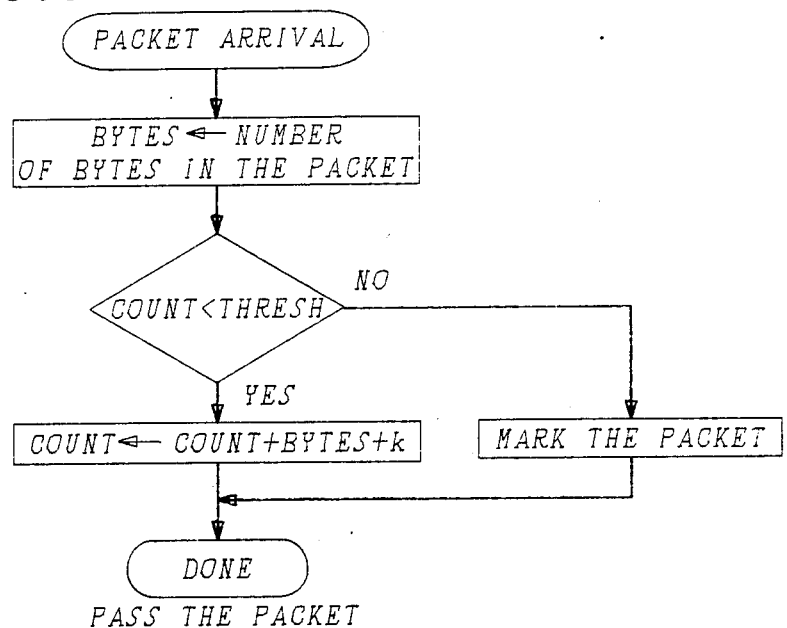
FIG. 3 shows a flow chart of an algorithm for monitoring the rate of transmission of a customer and for marking the customer's packets when the rate of transmission is excessive.

One of those algorithms, Algorithm (A), is shown in FIG. 3 with a graphic example thereof illustrated in FIG. 5.

Initialization for the Algorithm (A):
1. Set the accumulator variable COUNT to 0.
2. Set the threshold variable THRESH to S.

Steps in the Algorithm (A):
1. During each interval, upon receipt of each packet from the customer's terminal (FIG. 3):
   a. Set the byte count variable BYTES to the number of bytes in the packet.
   b. Compare the value of COUNT with the value of THRESH and take the following actions: IF COUNT<THRESH, then pass the packet on unmarked and replace the value of COUNT by COUNT+BYTES+k.

Otherwise, if COUNT>THRESH, then mark the packet, pass it on, and keep the same COUNT.

2. At the end of every interval (FIG. 4):
   a. Replace the value of COUNT by COUNT−c or 0, whichever is larger.
   b. Set THRESH to COUNT+S or M, whichever is smaller.

In FIG. 5 the vertical axis presents the value in bytes for the parameter k, the value of BYTES for the current packet, the value of the short-term threshold S and the value of the long-term threshold M, the value of the threshold variable THRESH, and the decrement constant c. The horizontal axis is time-divided by equal intervals I. Interval I is the duration between two instants of time, such as the instants t0 and t1. Also along the horizontal axis there is a series of numbers, each of which identifies a specific arriving packet.

Parameter k is shown in FIG. 5 as upward-directed arrows with solid arrowheads. It is a constant value for all packets of a virtual connection with the value typically in the range 0-1000. According to the algorithms, COUNT is incremented by the parameter k every time a packet arrives.

The value BYTES is represented in FIG. 5 by upwardly directed arrows with open arrowheads and various values for the several arriving packets. According to the algorithm, COUNT is incremented by BYTES every time a packet arrives, except when the packet is to be marked.

The accumulated values of COUNT are shown in FIG. 5 as heavy horizontal line segments.

The values of THRESH are shown in FIG. 5 as a light dotted line.

When the packet arrives, COUNT is compared with THRESH. If COUNT is less than THRESH, the packet is not marked and COUNT is incremented. If COUNT is equal to or greater than THRESH, the packet is marked and COUNT is not incremented.

Stars are positioned above the lines (representing the parameter k and BYTES) of packets which are to be marked because those packets are determined to be transmitted at an excessive transmission rate.

The decrement constant c is shown in FIG. 5 by downwardly directed open headed arrows, which are of constant value and occur at the end of each interval I except when COUNT would be decremented below zero.

Figure 4:
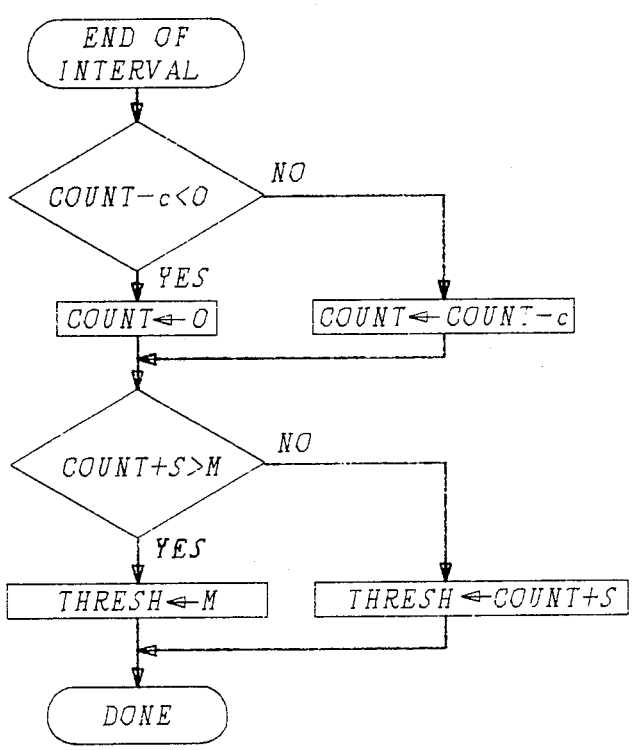
FIG. 4 presents a flow chart of an algorithm for periodically adjusting a counter used in monitoring the rate of transmission of a customer and for determining a dynamic threshold relating to a customer's selected rate of transmission.

Also in the algorithm of FIG. 4, the sum of COUNT plus the value of S is compared with the value of M. If the sum is greater than M, THRESH is set to M. If the sum is less than or equal to M, THRESH is set to the sum of COUNT plus the value of S.

Once the decision is made to mark the packet or not and the packet header is marked appropriately, the packet proceeds through the access node 20 of FIG. 1 to an output controller before being put into an output buffer associated with the output link, through which the packet is to be transmitted. At that time, the information in the packet header field, reserved for the marking signal, is forwarded to a packet dropping logic circuit 53, associated with node 30 of FIG. 1. A more detailed block diagram of the packet dropping logic circuit 53 is presented in FIG. 6.

Figure 6:
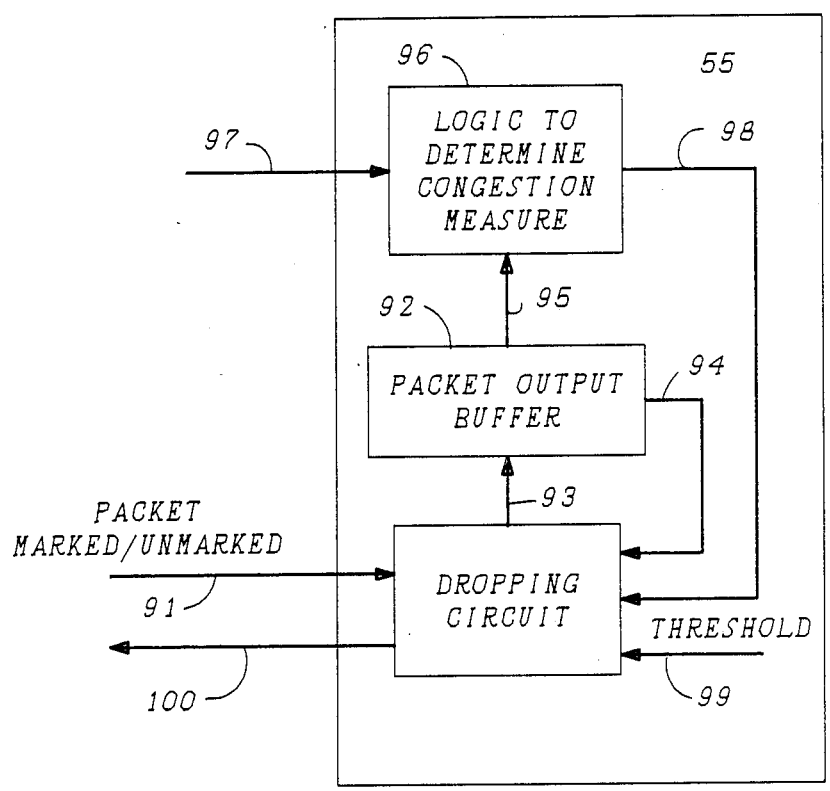
FIG. 6 is a block diagram of circuitry arranged for dropping marked packets within the network.
Figure 7:
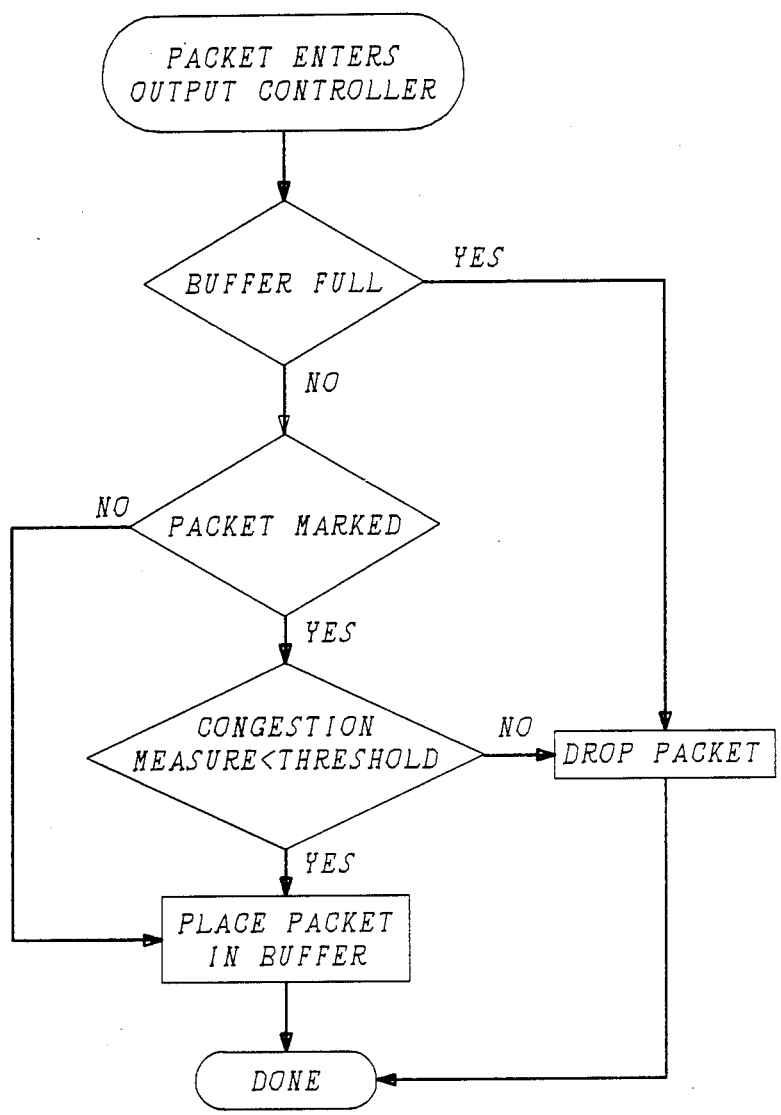
FIG. 7 shows a flow chart of an algorithm for dropping market packets which encounter congestion within the network.

In FIGS. 6 and 7 there is shown both a block diagram and the algorithm for the logic of determining whether or not to drop the current packet which is about to be applied to the output buffer of the access node 30 or which is about to be applied to the output buffer of any of the switch nodes 40, 50, 60 and 70 of FIG. 1.

It is assumed that traffic is light to moderate in the nodes 30, 40 and 60 along the virtual connection. At the switch node 50, however, traffic is heavy enough to create a congestion condition.

First of all, the packet dropping logic circuits 53 and 54, which are associated with lightly loaded nodes 30 and 40 and are like the logic circuit 55 of FIG. 6, run the algorithm of FIG. 7. Since there is no congestion at these nodes and the output buffers are not full when tested, whether or not the current packet is marked, it is passed to the output buffer of the relevant mode for transmission along the virtual connection.

Next the packet traverses the node 50, the congested node. The packet is applied to a dropping circuit 90 in the packet dropping logic circuit 55 by way of a lead 91. Before the packet is placed in its identified packet output buffer 92 by way of a lead 93, that buffer is checked to determine whether or not it is full. If the buffer 92 is full, a signal is forwarded through a lead 94 to the dropping circuit 90. Regardless of whether or not the packet is marked, if the output buffer 92 is full, the packet is dropped. Whether or not the output buffer is full, a measurement of congestion is determined. The number of packets in the packet output buffer 92 is applied by way of a lead 95 to a congestion measuring circuit 96. At the same time, a signal representing the availability of processor real time is applied to the congestion measuring circuit 96 by way of a lead 97.

In response to the signals on the leads 95 and 97, the circuit 96 produces a signal on a lead 98 indicating the amount of congestion that exists at the node 50 of FIG. 1. The congestion signal on the lead 98 and a threshold value applied by way of a lead 99 determine whether or not marked packets are to be dropped by the dropping circuit 90. A signal indicating that a packet should be dropped is transmitted by way of a lead 100 to the switch node 50. When the packet dropping signal occurs, the relevant packet is dropped (if it is a marked packet) or is placed in the output buffer 92 for subsequent transmission through the link 76 of FIG. 1 (if it is an unmarked packet).

The congestion measure is a threshold picked to guarantee that a certain quantity of resources are available in the node for passing unmarked packets. A weighted sum of the number of packets residing in the output buffer 92 plus the amount of real time available in the processor is used to measure congestion. The amount of real time is related to the parameter k. When the parameter k is equal to zero, real time is not a concern. Then the number of packets in the output buffer is the only measure of congestion.

Since the packet is dropped at the node 50 when that node is congested and the packet is a marked packet, the congestion is somewhat relieved. The packet being dropped is one previously marked at the access node 30 as a packet being transmitted at an excessive transmission rate. A congestion condition, less critical than a full output buffer, is relieved by dropping only the marked packets. Under such a condition, unmarked packets are passed through to their destination.

Congestion, therefore, is relieved for the most part by dropping the packets of customers who are transmitting at rates which exceed their agreed upon, or assigned, transmission rate. The network, therefore, can adequately serve all subscribers who transmit within their subscribed transmission rate.

ALTERNATIVE BANDWIDTH MONITORING AND PACKET MARKETING -ALGORITHM (B)

Figure 8:
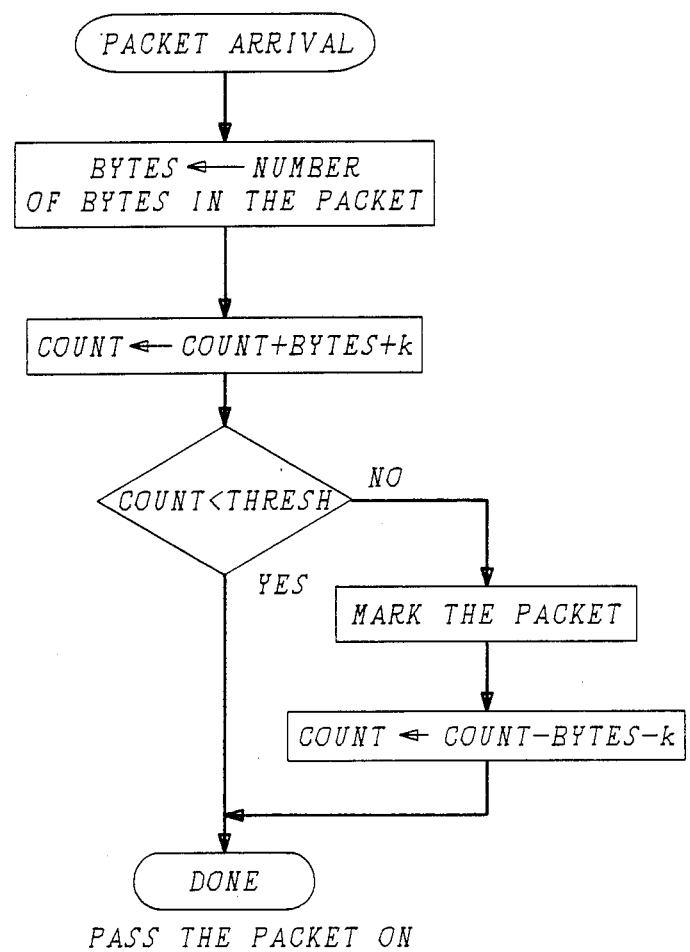
FIG. 8 presents another algorithm for monitoring the rate of transmission of a customer and for marking customer's packets when the rate of transmission is excessive.

Turning now to FIGS. 8 and 9, there is shown an alternative algorithm for determining which packets are to be marked together with a graphical presentation of how that algorithm operates on a series of received packets. Only the first step (the marking step) is different from the earlier described algorithm explained with respect to FIGS. 3 and 4. Initialization and parameters have the same or a similar meaning except that a new value of COUNT is determined before the value of COUNT is compared with the value of THRESH. The value of BYTES plus the parameter k is added to the value of COUNT before the comparison occurs. Subsequently when the value of COUNT is determined to be less than the value of THRESH, the packet is not marked and is passed along. The existing value of COUNT is retained. If COUNT is equal to or greater than THRESH, the packet is marked and passed along. Then the value of COUNT is decremented by the sum of BYTES plus the parameter k. As with the earlier described packet marking algorithm, Algorithm (A), packets which are marked are considered to be only those being transmitted at an excessive transmission rate.

Initialization for the Algorithm (B):
1. Set the counter variable COUNT to 0.
2. Set the threshold variable THRESH to S.

Steps in the Algorithm (B):
1. During each interval upon receipt of each packet from the customer's terminal (FIG. 8):
   a. Set the byte count variable BYTES to the number of bytes in the packet.
   b. Replace the value of COUNT by COUNT+BYTES+k.
   c. Compare the value of COUNT with the value of THRESH and take the following actions: If COUNT<THRESH, then pass the packet on unmarked. Otherwise, if COUNT>THRESH, then mark the packet, pass it on, and replace the value of COUNT by the value of COUNT-BYTES-k.
2. At the end of every interval I (FIG. 4):
   a. Replace the value of COUNT by COUNT-c or 0, whichever is larger.
   b. Set THRESH to COUNT+S or M, whichever is smaller.

FIG. 9 shows the result of the series of packets being monitored by the algorithm of FIG. 8. Stars positioned above the lines, representing the parameter k and BYTES for the packets, indicate that those packets are to be marked as excessive transmission rate packets.

SPECIAL SERVICE PACKET MARKING

A special new service can be offered to customers. The new service offering is based on the fact that the network is arranged for dropping marked packets wherever and whenever the marked packets encounter a congestion condition or a full buffer condition. This new service is a low-cost, or economic rate, service.

By subscribing to or choosing, the economic rate service, the customer assumes a risk that transmitted messages will not be delivered to their destination if they encounter congestion. The operating equipment (either at the customer's terminal or at the access node) is arranged to mark every packet transmitted by the economic rate service customer. Thereafter, as the marked packets proceed through the packet switching network, they are treated like other marked packets. If these marked economic rate service packets traverse a point of congestion or arrive at a full buffer in the network, the packets are marked. Since all of the economic rate packets are dropped, there is a high probability that the message will not be delivered during busy traffic conditions.

During hours of light traffic, however, there is a high probability that there is no congestion nor full buffers. At such times, the message is likely to traverse the network successfully on the first try.

This economic rate service will benefit both the operating communications company and the customer. The customer benefits from the low rate charges. The operating company benefits because customers of this service will tend to transmit economic rate service messages during slow traffic times when much of the company is equipment is idle and much spare capacity is available.

CONGESTION CONTROL

The approach adopted in this invention offers the following advantages over existing techniques for controlling congestion in a packet switching system. First, it affords customers both a guaranteed level of information throughput as well as the opportunity to avail themselves of excess capacity that is likely to exist in the network (depending on the instantaneous level of network congestion) to realize information throughputs beyond their guaranteed levels. This provides customers flexibility in trading of factors such as guaranteed and expected levels of throughput, integrity of information transport through the network, and the associated costs paid to the network provider for different grades of service.

Second, the approach affords the network provider greater flexibility in the provisioning of key network resources to meet the demands of customers, in that the network resources can be provisioned to meet the total demands due to the guaranteed average throughputs of all customers (with a high level of certainty) rather than a statistically-predicted peak total demand of all customers. This lessens the conservatism required in network resource provisioning and allows a higher average level of network resource utilization; customers can be induced to utilize excess network capacity by sending information above their guaranteed throughputs for certain applications.

Finally, the congestion control, as illustrated in FIGS. 1-9, is a distributed control that employs the monitoring and marking of packets at access nodes and the dropping of marked packets at any network node that may be experiencing congestion. The control is completely decoupled from actions that may be adopted by customers at the end terminal equipments. Distribution of the control through the network eliminates the need for very low-delay signaling mechanisms between network nodes that would otherwise be needed if excessive rate packets were to be dropped at access nodes. The decoupling of the control from terminal actions eliminates the dependence of the integrity of the control scheme on terminal actions, as is the case with some other control schemes. The distribution of control provides a robustness to the control and an ensured protection of both the network and well-behaved other customers from customers who abusively send packets at excessive transmission rates.

The foregoing describes both apparatus and methods for marking packets being transmitted at an excessive transmission rate when received at an access node, or being transmitted from a special customer, and for dropping marked packets at any node in the network when a congestion condition exists. The apparatus and methods described herein together with other apparatus and methods made obvious in view thereof are considered to be within the scope of the appended claims.

What is claimed is:

1. A method for marking an excessive bandwidth packet in a packet switching network, the method comprising the steps of:
   a. accumulating a count of bytes of data arriving at an access node per interval;
   b. receiving a packet with a number of bytes of data;
   c. comparing the accumulated count of bytes of data arriving at the access node per interval with a predetermined threshold;
   d. if the accumulated count is less than the threshold, incrementing the count in the accumulator by a constant plus the number of bytes of data in the received packet;
   e. if the accumulated count is greater than the threshold, marking the received packet; and
   f. subsequent to step d or e, passing the unmarked or marked packet along in the access node.

2. A method for marking an excessive bandwidth packet in a packet switching network, the method comprising the steps of:
   a. sorting one customer's packets of data from other packets of data;
   b. accumulating the count of bytes of the one customer's packets of data arriving at an access node per interval;
   c. receiving a packet from the one customer with a number of bytes of data;
   d. comparing the accumulated count of bytes of the one customer's packets of data arriving at the access node per interval with a predetermined threshold;
   e. if the accumulated count of bytes of data is less than the threshold, increment the count in the accumulator by a constant plus the number of bytes of data in the received packet;
   f. if the accumulated count is greater than the threshold, mark the received packet; and
   g. subsequent to step e or f, pass the unmarked or marked packet along in the access node.

3. The method for marking an excessive bandwidth packet in accordance with claim 1 or 2 comprising the further steps of:
   subsequently multiplexing the unmarked or marked packet of data with other marked and unmarked packets of data; and
   transmitting the multiplexed packets of data through a link to another switch node or terminal.

4. The method for marking an excessive bandwidth packet, in accordance with claim 1, comprising the further steps of:
   g. transmitting the unmarked or marked packet of data to a point in the network;
   h. determining whether or not the network has spare capacity at that point; and
   i. if there is no spare capacity at that point in the network, passing the packet only if it is unmarked.

5. A method for marking an excessive bandwidth packet in a packet switching network, the method comprising the steps of:
   a. accumulating a count of bytes of data arriving at an access node per interval;
   b. receiving a packet with a number of bytes of data;
   c. incrementing the count in the accumulator by a constant plus the number of bytes of data in the received packet;
   d. comparing the accumulated count of bytes of data arriving at the access node per interval with a predetermined threshold;

e. if the accumulated count is greater than the threshold, marking the received packet and decrementing the count in the accumulator by the constant and the number of bytes of data in the received packet; and f. subsequent to steps d or e, passing the unmarked or marked packet along in the access node.

6. A method for marking an excessive bandwidth packet in a packet switching network, the method comprising the steps of:

a. sorting one customer's packets of data from other packets of data;

b. accumulating the count of bytes of the one customer's packets of data arriving at an access node per interval;

c. receiving a packet from the one customer with a number of bytes of data;

d. incrementing the count in the accumulator by a constant plus the number of bytes of data in the received packet from the one customer;

e. comparing the accumulated count of bytes of data arriving at the access node per interval with a predetermined threshold;

f. if the accumulated count is greater than the threshold, marking the received packet and decrementing the count in the accumulator by the constant and the number of bytes of data in the received packet; and g. subsequent to steps e or f, passing the unmarked or marked packet along in the access node.

7. The method for marking an excessive bandwidth packet, in accordance with claim 5, comprising the steps of:

g. transmitting the unmarked or marked packet of data to a point in the network;

h. determining whether or not the network has spare capacity at that point; and i. if there is no spare capacity at that point in the network, passing the packet only if it is unmarked.

8. A method for marking a packet in a packet switching network, the method comprising the steps of:

a. accumulating a value resulting from bytes included in one customer's packet of data arriving at an access node per interval;

b. receiving another one of the customer's packets;

c. determining whether or not the accumulated value is within a predetermined range of values;

d. if the accumulated value is within the predetermined range of values, mark the another one packet; and e. pass the marked or unmarked another one packet along in the network.

9. A method for marking a packet in accordance with claim 8 and comprising the further step of:

f. decrementing the accumulated value at the end of each interval.

10. A packet switching access node with a receive terminal;

an access channel interconnected with the receive terminal for transmitting packets of data at a selectable one of a plurality of transmission rates;

means for determining the rate at which a packet of data is being transmitted through the access channel and generating a marking bit whenever the determined rate is an excessive rate; and means for inserting the marking bit into the packet of data.

11. A packet switching access node, in accordance with claim 10, further comprising means for transmitting an unmarked or marked packet of data into the network;

means for determining whether or not the network has spare capacity; and if there is no spare capacity in the network, transmitting the packet only if it is unmarked.

12. A method for marking an excessive bandwidth packet in a packet switching network, the method comprising the steps of:

a. accumulating a count of bytes of data arriving at a node per interval;

b. receiving a packet with a number of bytes of data;

c. comparing the accumulated count of bytes of data arriving at the node per interval with a predetermined threshold;

d. if the accumulated count is less than the threshold, incrementing the count in the accumulator by a constant plus the number of bytes of data in the received packet;

e. if the accumulated count is greater than the threshold, marking the received packet; and f. subsequent to step d or e passing the unmarked or marked packet along in the node.

13. A method for marking an excessive bandwidth packet in a packet switching network, the method comprising the steps of:

a. sorting one customer's packets of data from other packets of data;

b. accumulating the count of bytes of the one customer's packets of data arriving at a node per interval;

c. receiving a packet from the one customer with a number of bytes of data;

d. comparing the accumulated count of bytes of the one customer's packets of data arriving at the node per interval with a predetermined threshold;

e. if the accumulated count of bytes of data is less than the threshold, increment the count in the accumulator by a constant plus the number of bytes of data in the received packet;

f. if the accumulated count is greater than the threshold, mark the received packet; and g. subsequent to step e or f, pass the unmarked or marked packet along in the node.

14. The method for marking an excessive bandwidth packet in accordance with claim 12 or 13 comprising the further steps of:

subsequently multiplexing the unmarked or marked packet of data with other marked and unmarked packets of data; and transmitting the multiplexed packets of data through a link to another switch node or terminal.

15. The method for marking an excessive bandwidth packet, in accordance with claim 12, comprising the further steps of:

g. transmitting the unmarked or marked packet of data in the network;

h. determining whether or not the network has spare capacity; and i. if there is no spare capacity in the network, passing the packet only if it is unmarked.

16. A method for marking an excessive bandwidth packet in a packet switching network, the method comprising the steps of:

a. accumulating a count of bytes of data arriving at a node per interval;

b. receiving a packet with a number of bytes of data;

c. incrementing the count in the accumulator by a constant plus the number of bytes of data in the received packet;
d. comparing the accumulated count of bytes of data arriving at the node per interval with a predetermined threshold;
e. if the accumulated count is greater than the threshold, marking the received packet and decrementing the count in the accumulator by the constant and the number of bytes of data in the received packet; and
f. subsequent to steps d or e, passing the unmarked or marked packet along in the node.

17. A method for marking an excessive bandwidth packet in a packet switching network, the method comprising the steps of:
a. sorting one customer's packets of data from other packets of data;
b. accumulating the count of bytes of the one customer's packets of data arriving at a node per interval;
c. receiving a packet from the one customer with a number of bytes of data;
d. incrementing the count in the accumulator by a constant plus the number of bytes of data in the received packet from the one customer;
e. comparing the accumulated count of bytes of data arriving at the node per interval with a predetermined threshold;
f. if the accumulated count is greater than the threshold, marking the received packet and decrementing the count in the accumulator by the constant and the number of bytes of data in the received packet; and
g. subsequent to steps e or f, passing the unmarked or marked packet along in the node.

18. The method for marking an excessive bandwidth packet, in accordance with claim 16, comprising the steps of:
g. transmitting the unmarked or marked packet of data in the network;
h. determining whether or not the network has spare capacity; and
i. if there is no spare capacity in the network, passing the packet only if it is unmarked.

19. A method for marking a packet in a packet switching network, the method comprising the steps of:
a. accumulating a value resulting from bytes included in one customer's packet of data arriving at a node per interval;
b. receiving another one of the customer's packets;
c. determining whether or not the accumulated value is within a predetermined range of values;
d. if the accumulated value is within the predetermined range of values, mark the another one packet; and
e. pass the marked or unmarked another one packet along in the network.

20. A method for marking a packet in accordance with claim 19 and comprising the further step of:
f. decrementing the accumulated value at the end of each interval.

21. A packet switching node with a receive terminal;
a channel interconnected with the receive terminal for transmitting packets of data at a selectable one of a plurality of transmission rates;
means for determining the rate at which a packet of data is being transmitted through the channel and generating a mark whenever the determined rate is an excessive rate; and
means for storing the mark with the packet of data.

22. A packet switching node, in accordance with claim 21, further comprising
means for transmitting an unmarked or a marked packet of data in a network;
means for determining whether or not the network has spare capacity; and
if there is no spare capacity in the network, transmitting the packet only if it is unmarked.

23. A method for marking an excessive bandwidth packet in accordance with claim 1, 2, 12, or 13 comprising the further step of
decrementing the accumulated count at the end of each interval.

* * * * *

UNITED STATES PATENT AND TRADEMARK OFFICE
CERTIFICATE OF CORRECTION

PATENT NO. : 4,769,810
DATED : September 6, 1988
INVENTOR(S) : A. E. Eckberg, Jr., et al.

It is certified that error appears in the above-identified patent and that said Letters Patent is hereby corrected as shown below:

In the Specification

```
col. 2, line 53,  delete "very", first occurrence;
        line 55,  delete the comma;
        line 57,  delete "numbe" and substitute therefore
                    --number--;
        line 59,  delete the comma.
col. 3, line 20,  delete "of" and substitue therefore --or--.
col. 4, line 11,  delete "marketing" and substitute therefore
                    --marking--;
        line 27,  delete "market" and substitute therefore
                    --marked--;
        line 29,  after "presents" insert --a flow chart of--;
        line 33,  delete "performance".
col. 5, line 9,   before "packets" insert --specific--.
col. 6, line 7,   delete the comma.
col. 7, line 19,  after "for" insert --the parameter--;
        line 20,  after "of" insert --the parameter--;
        line 23,  delete "whic" and substitute therefore
                    --which--;
        line 41,  delete "MARKETING" and substitute therefore
                    --MARKING--.
```

UNITED STATES PATENT AND TRADEMARK OFFICE
CERTIFICATE OF CORRECTION

PATENT NO. : 4,769,810

DATED : September 6, 1988

INVENTOR(S) : A. E. Eckberg, Jr., et al.

It is certified that error appears in the above-identified patent and that said Letters Patent is hereby corrected as shown below:

```
col. 9, line 58, delete "MARKETING" and substitute therefore
                 --MARKING--.
col.10, line 28, delete ">" and substitute therefore --≥--.
col.11, lines 6&7, "company is" should read --company's--;
        lines 35-38, after "utilization" delete the
                 semicolon, substitute therefore a period,
                 and delete the rest of the sentence.
```

Signed and Sealed this

Twentieth Day of June, 1989

Attest:

DONALD J. QUIGG

Attesting Officer

Commissioner of Patents and Trademarks